United States Patent
Calogero

(10) Patent No.: US 7,497,066 B2
(45) Date of Patent: Mar. 3, 2009

(54) METHOD FOR MANUFACTURING AIR FILLED PACKING CUSHIONS

(75) Inventor: Stella Calogero, Certaldo (IT)

(73) Assignee: Fill Teck S.R.L., Florence (IT)

( * ) Notice: Subject to any disclaimer, the term of this patent is extended or adjusted under 35 U.S.C. 154(b) by 0 days.

(21) Appl. No.: 10/546,203

(22) PCT Filed: Feb. 16, 2004

(86) PCT No.: PCT/EP2004/001435

§ 371 (c)(1),
(2), (4) Date: Sep. 15, 2005

(87) PCT Pub. No.: WO2004/074104

PCT Pub. Date: Sep. 2, 2004

(65) Prior Publication Data

US 2006/0168912 A1    Aug. 3, 2006

(30) Foreign Application Priority Data

Feb. 18, 2003   (EP)   ................... 03425090

(51) Int. Cl.
*B65B 31/00* (2006.01)
*B65B 9/02* (2006.01)
(52) U.S. Cl. ............................................. 53/403; 53/79
(58) Field of Classification Search .................... 53/472, 53/403, 452, 477, 79, 553, 95
See application file for complete search history.

(56) References Cited

U.S. PATENT DOCUMENTS

| | | | | |
|---|---|---|---|---|
| 3,575,757 A | * | 4/1971 | Smith | 156/147 |
| 3,817,803 A | * | 6/1974 | Horsky | 156/85 |
| 4,029,539 A | * | 6/1977 | Doll | 156/513 |
| 4,169,002 A | * | 9/1979 | Larson | 156/145 |
| 4,169,344 A | * | 10/1979 | Ganz et al. | 53/546 |
| 4,674,268 A | * | 6/1987 | Gavronsky et al. | 53/468 |
| 4,769,106 A | * | 9/1988 | Busching | 156/497 |
| 4,894,265 A | * | 1/1990 | Chang et al. | 428/34.6 |
| 5,340,632 A | * | 8/1994 | Chappuis | 428/71 |
| 5,581,983 A | * | 12/1996 | Murakami | 53/512 |
| 5,937,614 A | * | 8/1999 | Watkins et al. | 53/79 |
| 6,209,286 B1 | * | 4/2001 | Perkins et al. | 53/403 |

* cited by examiner

*Primary Examiner*—Paul R Durand
(74) *Attorney, Agent, or Firm*—Dennison, Schultz & MacDonald

(57) ABSTRACT

A machine (1) for the production of packaging material in the form of air filled cushions (24) comprises feeding rollers (2) for conveying parallel two films of plastic material (20*a* and 20*b*), unwound starting from rolls (30*a* and 30*b*), according to a conveying direction. Downstream of the feeding rollers (2) air is supplied between the two films (20*a* and 20*b*) by means of a plurality of tubes (6) extending from a collector (5) and parallel to the conveying direction of the films (20*a* and 20*b*). Each tube (6) extends between two longitudinal heatsealing elements (10), crosses a couple of dragging rollers (8) and ends at transversal heat-sealing elements (15).

3 Claims, 6 Drawing Sheets

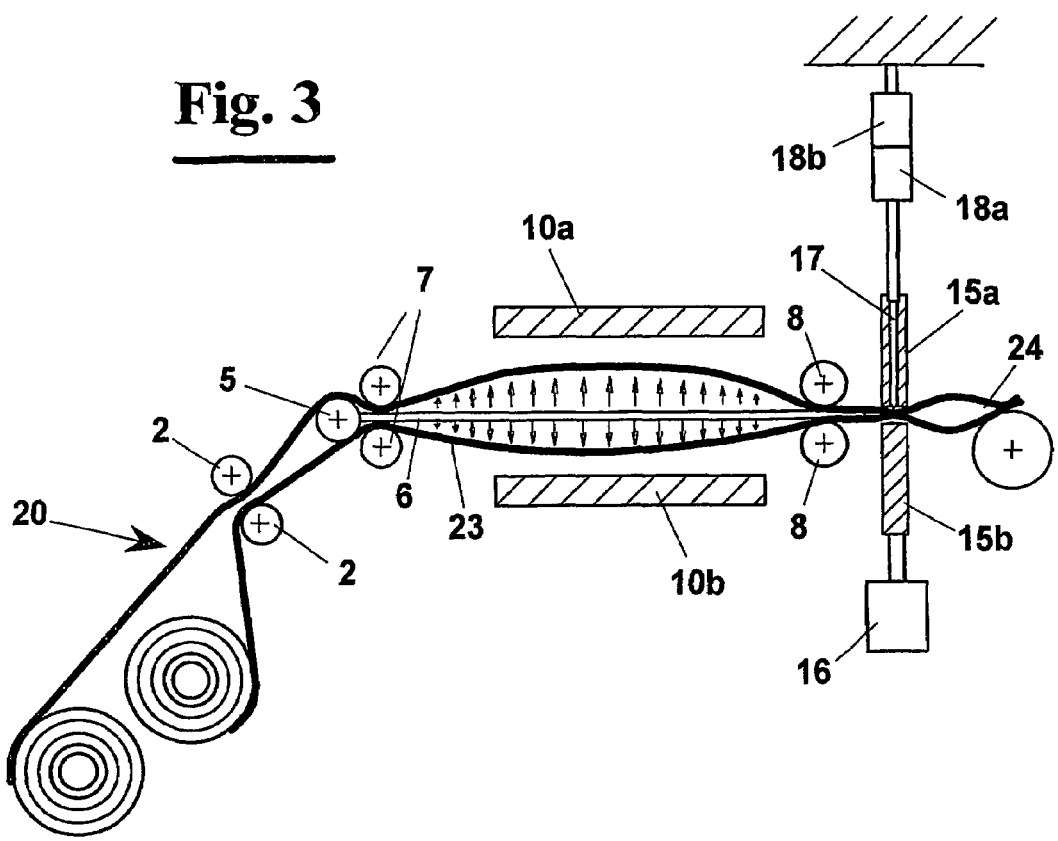
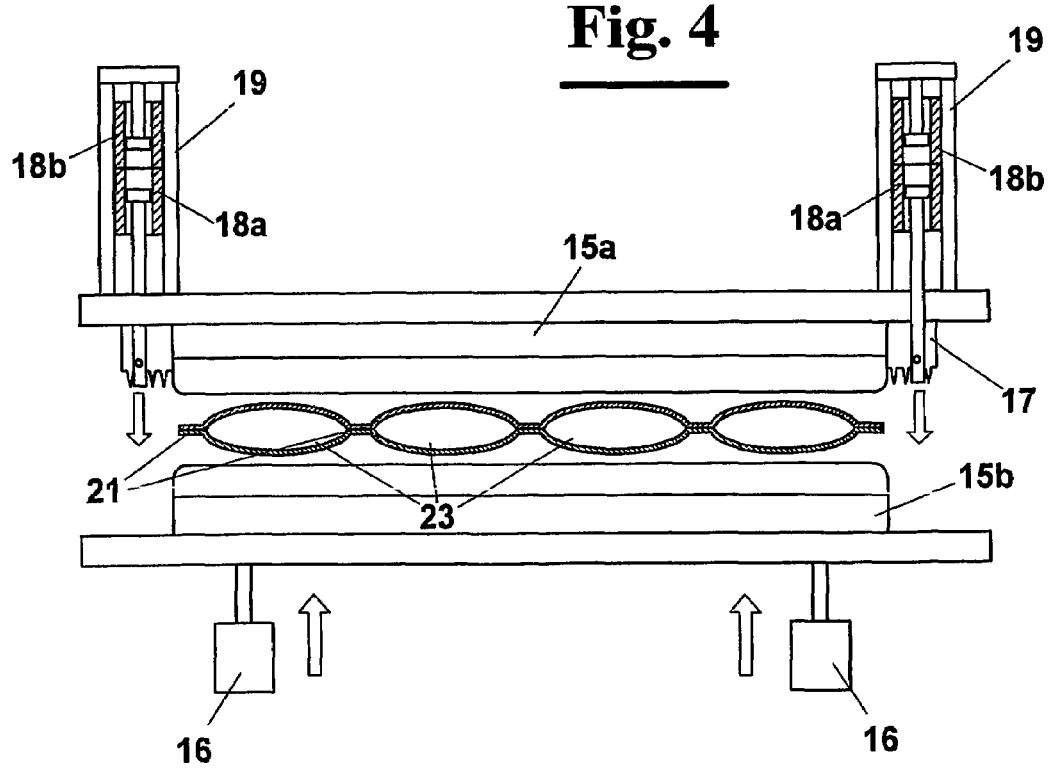

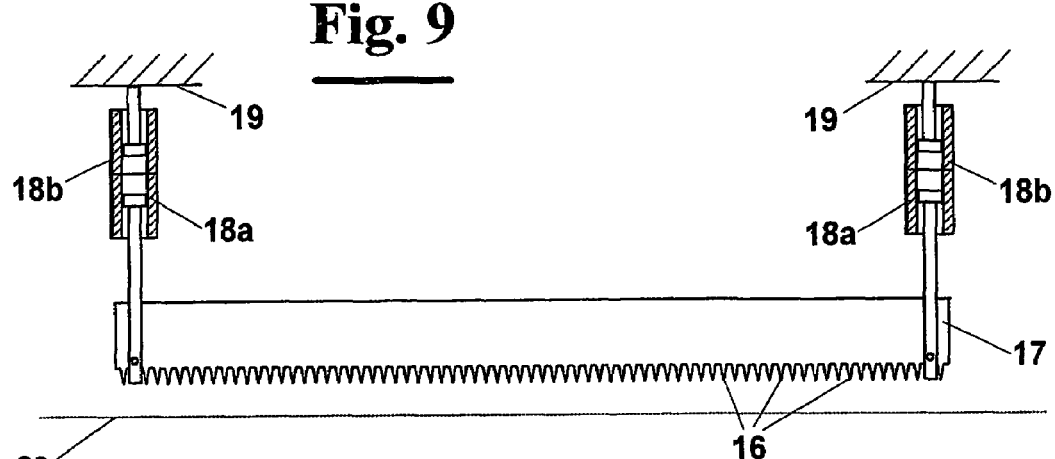
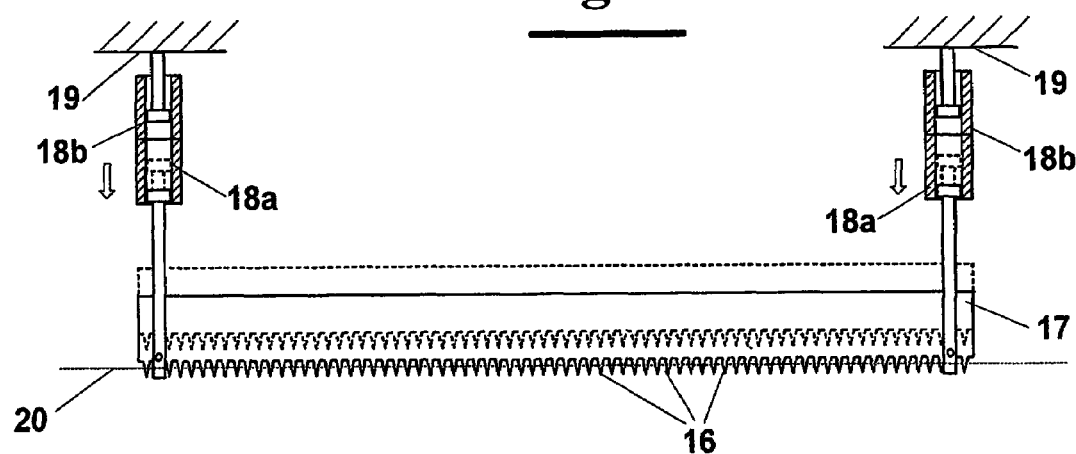
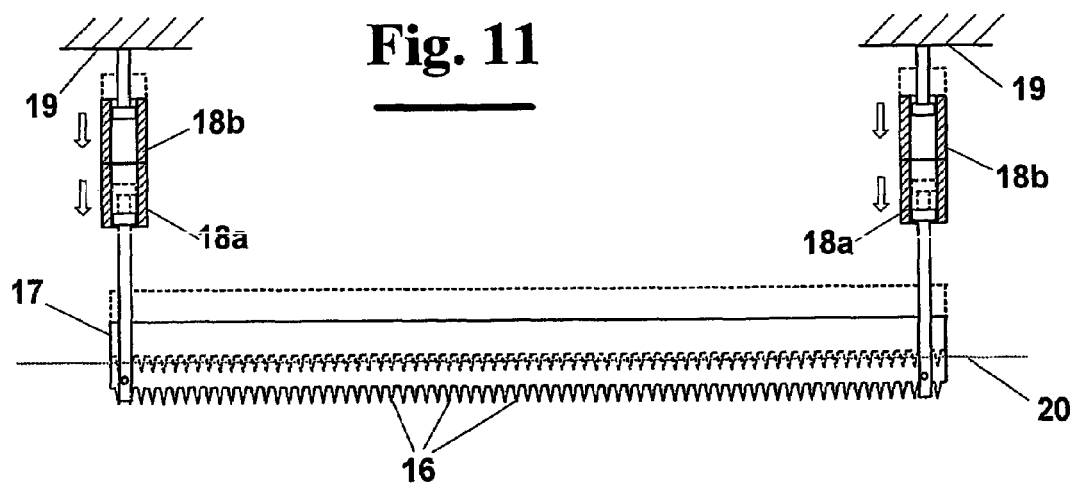

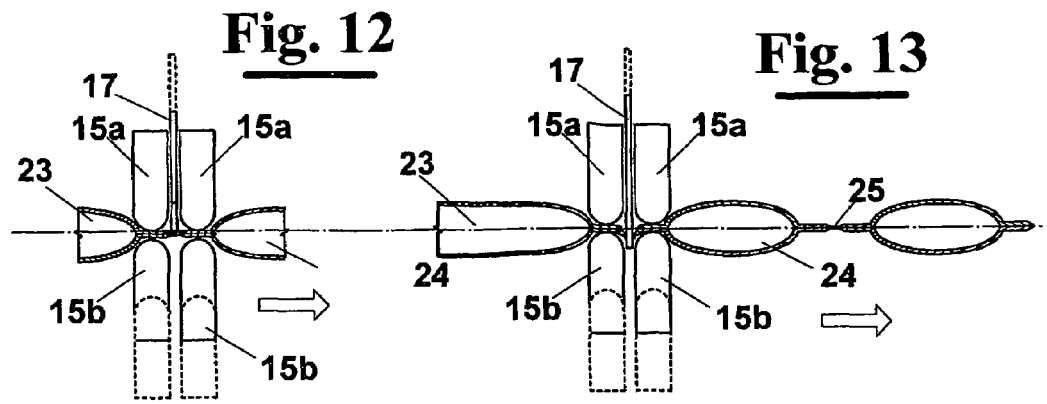
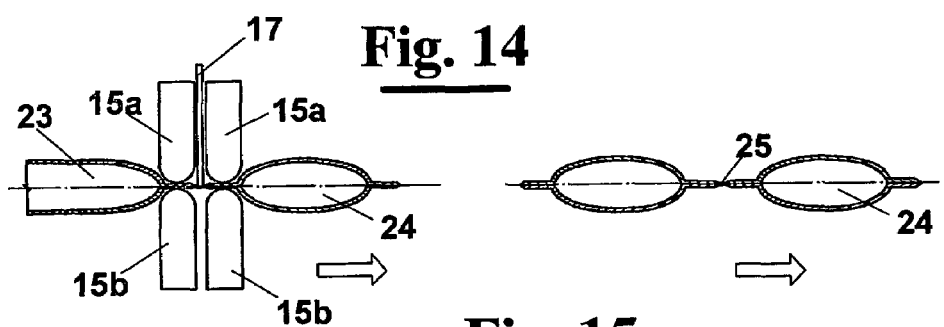
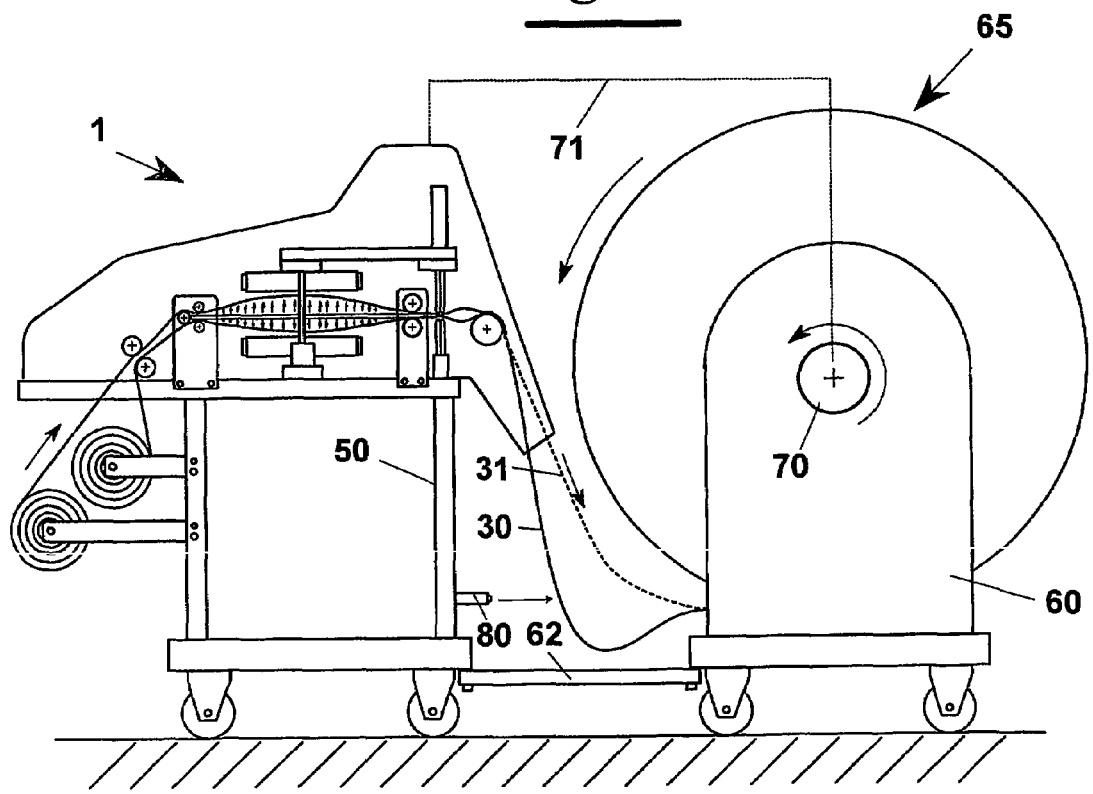

METHOD FOR MANUFACTURING AIR FILLED PACKING CUSHIONS

This application is a filing under 35 USC 371 of PCT/IB2004/001435 filed Feb. 16, 2004.

FIELD OF THE INVENTION

The present invention relates to the field of machines for the production of shock protecting material used for packaging and in particular it relates to a method for welding thermically such material in the form of air filled cushions during the production process thereof.

Furthermore, the invention relates to an apparatus that carries out this method.

DESCRIPTION OF THE PRIOR ART

As known, common packaging material comprise polystyrene foam, the polyurethane foam, polystyrene foam balls, etc.

However, such packaging material adds a not negligible weight to the final load and scatters when extracting the packaged objects. Therefore, in certain cases "cushions" of plastic films are preferred as shock protecting material, usually made of high density polyethylene having high mechanical resistance with respect to other plastic materials, air filled and used both for wrapping the transported objects and for blocking them in a container.

In the production of such cushions two films of high density polyethylene are unwound starting from rolls and coupled proceeding along a certain direction. Then, they are firstly welded along spaced longitudinal sealing lines, parallel to the direction of movement and defining tubular chambers. Then, in the tubular chambers, during the movement, air is blown which remains trapped therein after that two spaced couples are made of transversal sealing lines close to each other, orthogonal to the previous, obtaining closed cushions.

Both the longitudinal and the transversal sealing lines are made heating locally the polyethylene films by means of electrical resistance, or other heating source, which causes the films to soften locally and then to bind with each other. Furthermore, associated to the electrical resistances that are used for making each couple of transversal sealing lines, a blade is usually arranged suitable for cutting between the sealing lines, forming downstream an array of air filled cushions separated from the upstream ones still being formed; alternatively, the blade can make a tear line, that can be broken in a second time by an user.

In particular, the blade works simultaneously to the electrical resistance that makes the couple of transversal sealing lines; therefore, to switch between cut and tear line it is necessary to stop the machine, to disassemble the blade and change it or to set its position, and then to start again the process with relevant loss of time.

Another drawback of the prior art machines is that both the longitudinal and the transversal sealing lines are made at the same time by a same mechanism. Therefore, it is possible to change shape and size of the cushions only changing the speed of the films of plastic material within predetermined limits.

Furthermore, in the prior art machines the systems that hold the electrical resistances, or other heating devices, are not capable of applying high forces onto the polyethylene films. Therefore, a relatively long time is necessary for local heating the polyethylene films and causing it to soften in order to allow binding. All this strongly limits the speed of the production process.

SUMMARY OF THE INVENTION

It is therefore an object of the present invention to provide a machine for the production of packaging material in the form of cushions filled of air or other gas that allows an easy adjustment of the shape and the size of the cushions.

It is a first particular object of the invention to provide such a machine that allows to make tearing lines or cuts without any particular adjustment means.

It is a second particular object of the invention to provide such a machine that can work at high production rate.

It is another particular object of the invention to provide a method for the production of packaging material in the form of cushions filled of air or other gas capable of overcoming the drawbacks of the prior art.

A first aspect of the invention relates to a machine for the production of packaging material in the form of cushions filled with air or other gas comprising:
  means for feeding parallel to each other in a conveying direction two films of plastic material;
  means for blowing air or other gas in ducts arranged between the two films of plastic material;
  means for making longitudinal sealing lines on said films to define tubular chambers in which air is blown through said ducts;
  means for making on said films a couple of transversal sealing lines close to each other in order to form, substantially, cushions containing a certain amount of air, or other gas, trapped between two adjacent longitudinal sealing lines and two consecutive couples of transversal sealing lines close to each other;
  means for cutting orthogonally said cushions between each couple of transversal sealing lines close to each other;

whose main feature is that said means for cutting are movable towards/away from said cushions operated by at least one actuator, wherein said or each actuator is capable of moving selectively said means for cutting according to either a stroke for making a tear line or a stroke for making a complete cut.

Advantageously, said actuator, or said first actuator, for moving said means for cutting is associated to at least one second actuator. This way, it is possible to make a transversal tear line by operating only the first actuator or, alternatively, to make a cut for separating two consecutive cushions by operating at the same time the first and the second actuator.

Preferably, the means for cutting comprise a toothed blade having triangular teeth, whereby when making a tear line only the tips of the teeth penetrate the films of plastic material, whereas when making a full cut the teeth penetrate completely the films.

Preferably, the means for making said longitudinal sealing lines are operated by at least one actuator independent from the actuator of the means for making said transversal sealing lines, so that it is possible to adjust the size of the cushions by operating the respective actuators in a predetermined way.

Advantageously, said means for making said transversal sealing lines are two heat-sealing elements that act orthogonally to the films of plastic material, comprising electrical resistances suitable for heating said films up to causing it to partially melt and then to bind to each other. Such heat-sealing elements are associated to a toothed blade slidingly arranged between them. In particular, each heat-sealing element consists in a movable bar, movable orthogonally towards/away from the films of plastic material, and in a fixed bar that is located on the other side with respect to the film.

Preferably, the or each actuator is of pneumatic type.

The packaging material obtained by the machine as above described can be stored as single cushions or rows of cushions in boxes or bags, or wound into rolls. In the latter case, a support is provided equipped with a reel shaft brought into rotation by a motor for causing the cushions to be rolled about it at the outlet of the machine.

In particular, the support can be operatively connected by a stiff link to a basement on which the machine is mounted in order to avoid that when rolling the support same is displaced from a correct position. The motor that operates the reel shaft can be, furthermore, electrically connected to an electronics that operates the machine. This allows to turn on or off the motor according to the operative conditions that occur during the production of cushions.

Furthermore, means can be provided for testing the correct rolling of said cushions on said reel shaft comprising optical sensors that detect the presence of a loop along the web being rolled up. More in detail, the optical sensors are suitable for turning on or off the motor if the shape and or the size of the loop do not fall within determined values.

According to another aspect of the invention, a method for the production of packaging material in the form of air filled cushions, or other gas comprises the steps of:

feeding in parallel according to a conveying direction two films of plastic material;

blowing air or other gas in parallel ducts between the two films of plastic material;

making longitudinal sealing lines on said films to define tubular chambers in which air is blown through said ducts;

making couples of transversal sealing lines close to each other on said films in order to form substantially cushions containing a certain amount of air, or other gas, trapped between two adjacent longitudinal sealing lines and two consecutive couples of transversal sealing lines close to each other;

cutting orthogonal to said cushions between two consecutive couples of transversal sealing lines close to each other, whose main feature is that said step of cutting is made through means for cutting movable towards/away from said cushions operated by at least one actuator capable of moving selectively said means for cutting according to either a stroke for making a tear line or a stroke for making a complete cut.

In particular, the step of making transversal sealing lines is carried out by two heat-sealing elements, which act orthogonally to said films of plastic material, between which a toothed blade is slidingly arranged having triangular teeth. Each heat-sealing element consists in bars movable orthogonally to the cushions and in fixed bars arranged on the other side with respect to the films of plastic material. Therefore, for making the transversal sealing lines of the air filled cushions, the movable bars, operated by an actuator, approach the surface of the tubular chamber, squeeze it against the fixed bars, and make the transversal sealing lines for partially melting, or heat-sealing, the plastic material. Then, the toothed blade arranged between the two fixed bars translates orthogonally to the plane of the cushions for a cutting step that, according to the case, can be of making a tear line or a complete cut.

BRIEF DESCRIPTION OF THE DRAWINGS

The invention will be made clearer with the following description of an embodiment thereof, exemplifying but not limitative, with reference to attached drawings wherein:

FIG. 3 shows diagrammatically a longitudinal cross section of the machine of FIG. 1;

FIG. 4 shows a cross sectional view of the machine of FIG. 1 according to arrows IV-IV;

Figure 1:
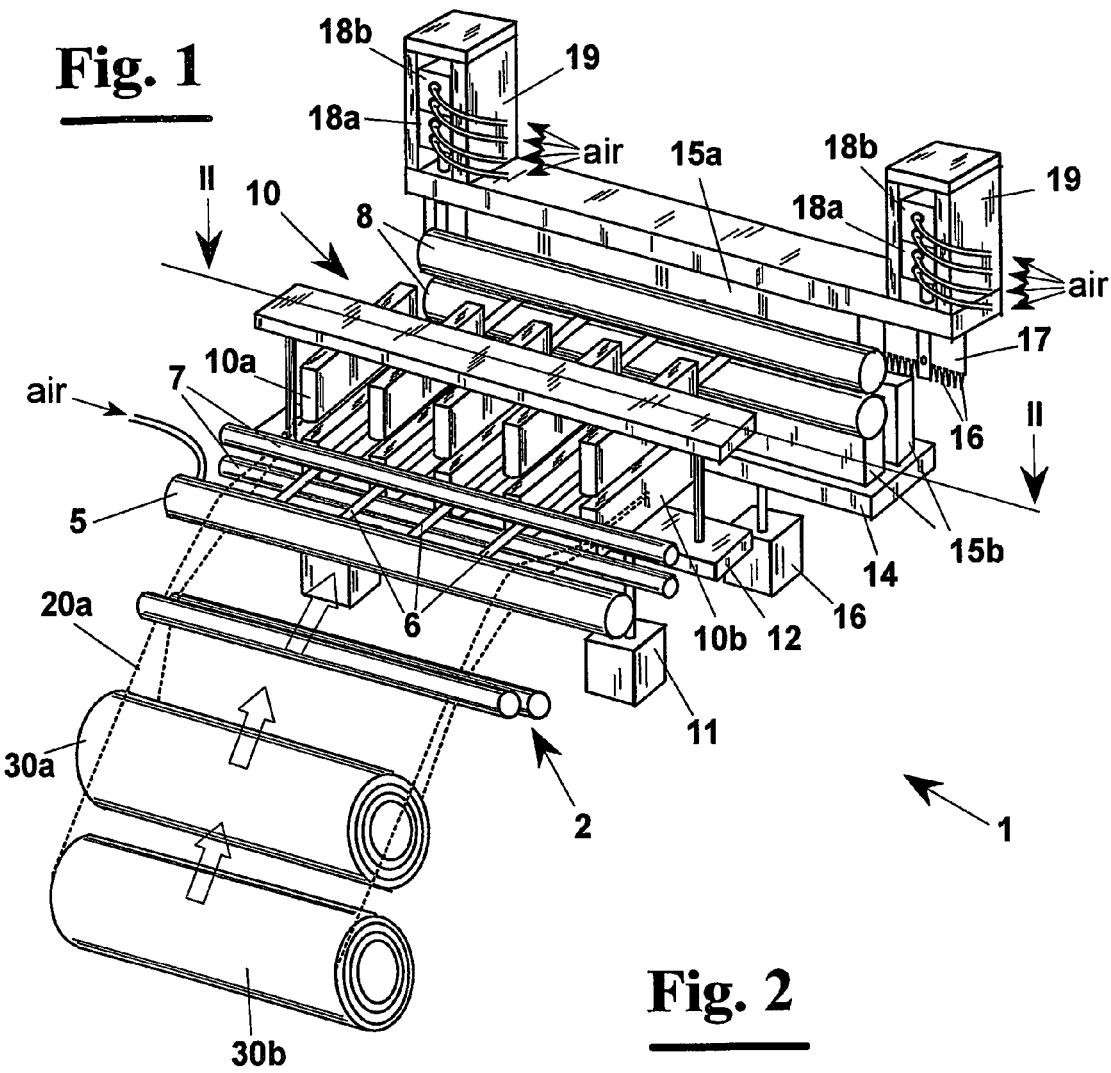
FIG. 1 shows a perspective view of a machine for the production of packaging material in the form of cushions filled with air, or other gas, according to the invention.

FIGS. from 9 to 11 show diagrammatically a cross sectional view of the relative positions of the toothed blade and of the films of plastic material respectively in case of return position, making a tear line and making a complete cut;

FIGS. from 12 to 14 show diagrammatically a cross sectional view of the relative positions of the blade and of the transversal heat-sealing elements, respectively in case of return position, making a tear line and making a complete cut;

FIG. 15 shows diagrammatically an elevational side view of the machine of FIG. 1 connected to a rolling support of the packaging material.

DESCRIPTION OF THE PREFERRED EMBODIMENT

Figure 2:
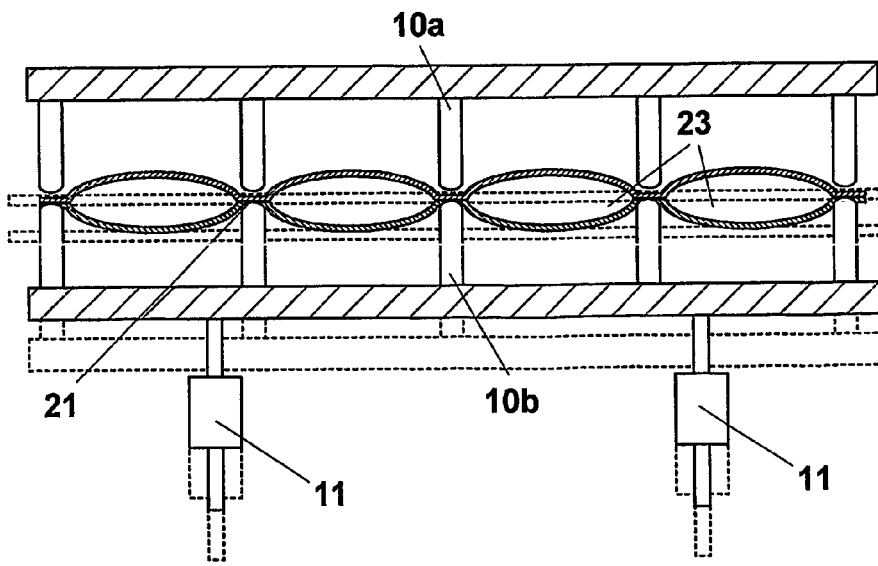
FIG. 2 shows a cross sectional view of the machine of FIG. 1 according to arrows II-II.

With reference to FIGS. 1 and 3, a machine 1 for the production of packaging material in the form of air filled cushions 24 (FIG. 6), according to the invention, comprises feeding rollers 2 for conveying two films of plastic material 20a and 20b parallel to each other, unreeled from rolls 30a and 30b, according to a direction of movement as indicated in the figure by the arrows. Downstream of the feeding rollers 2 there is a collector 5 to which air is supplied. The air is then blown in the space between the two films 20a and 20b by means of a plurality of tubes 6 pneumatically connected to collector 5 and parallel to the conveying direction of films 20a and 20b. Each tube 6 extends between two heat-sealing elements 10 suitable for making longitudinal sealing lines 21 onto films 20a and 20b (FIG. 2). This way, tubular chambers 23 are formed in which a certain amount of air is present.

Figure 6:
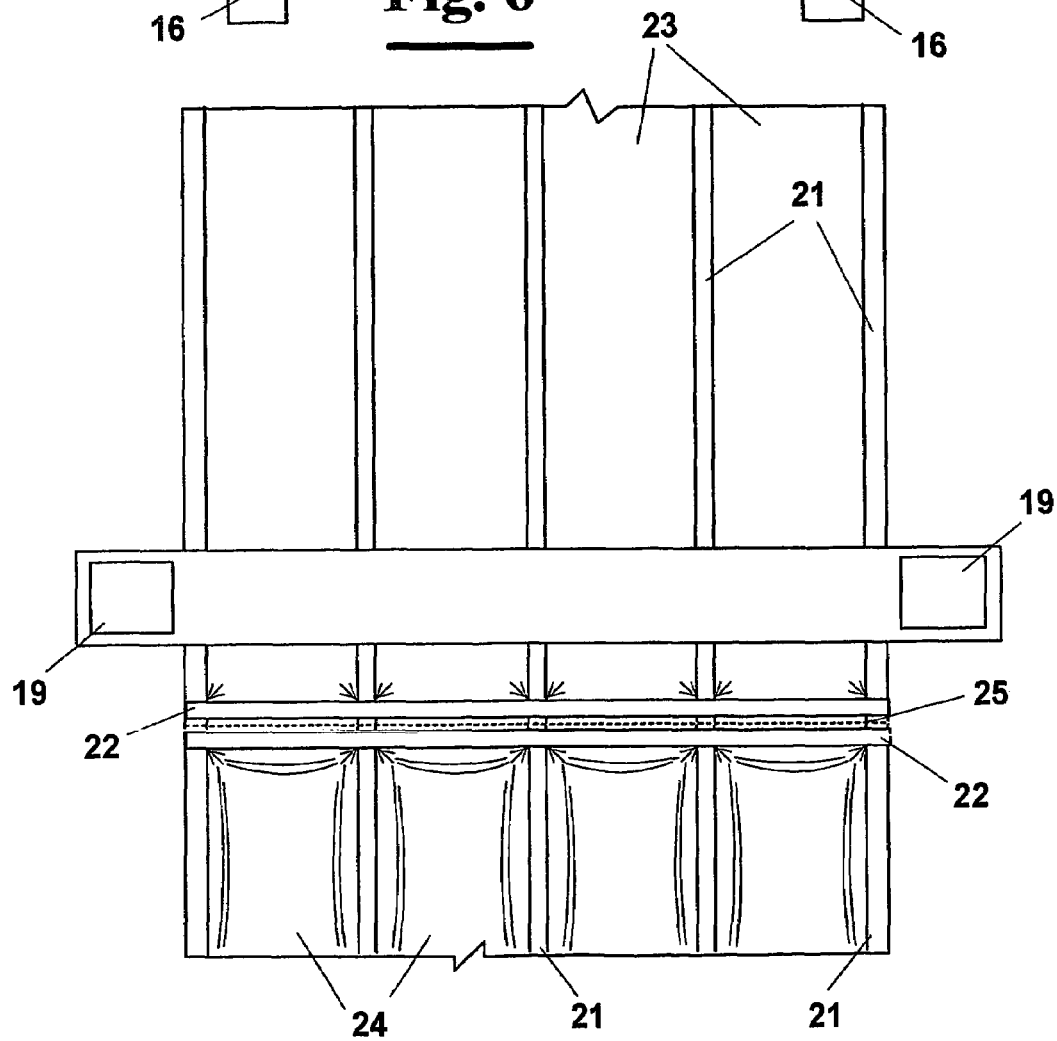

Then, tubular chambers 23 thus formed pass through a couple of dragging rollers 8 on whose surface a plurality is provided of circumferential grooves, not shown, through which tubes 6 pass. This allows tubes 6 to end at heat-sealing elements 15, which are suitable for making a couple of transversal sealing lines close to each other 22 on films 20a and 20b. Such transversal sealing lines 22 transform tubular chambers 23 into air filled cushions 24 (FIG. 6).

Each heat-sealing element 10, or 15, consists in a fixed bar 10a, or 15a, and in a movable bar 10b, or 15b, arranged orthogonally to the films of plastic material, and at opposite sides with respect to the films. In particular, the movable bars 10b are mounted on a support 12 allowing it to move towards/away from the films by means of actuators 11. Similarly, movable bars 15b are mounted on a support 14 operated by actuators 16.

Between fixed bars 15*b* a toothed blade is mounted 17, with triangular teeth 16, movable towards/away from the cushions 24 by means of two couples of pneumatic actuators 18*a* and 18*b* operatively connected to the ends of blade 17.

Figure 8:
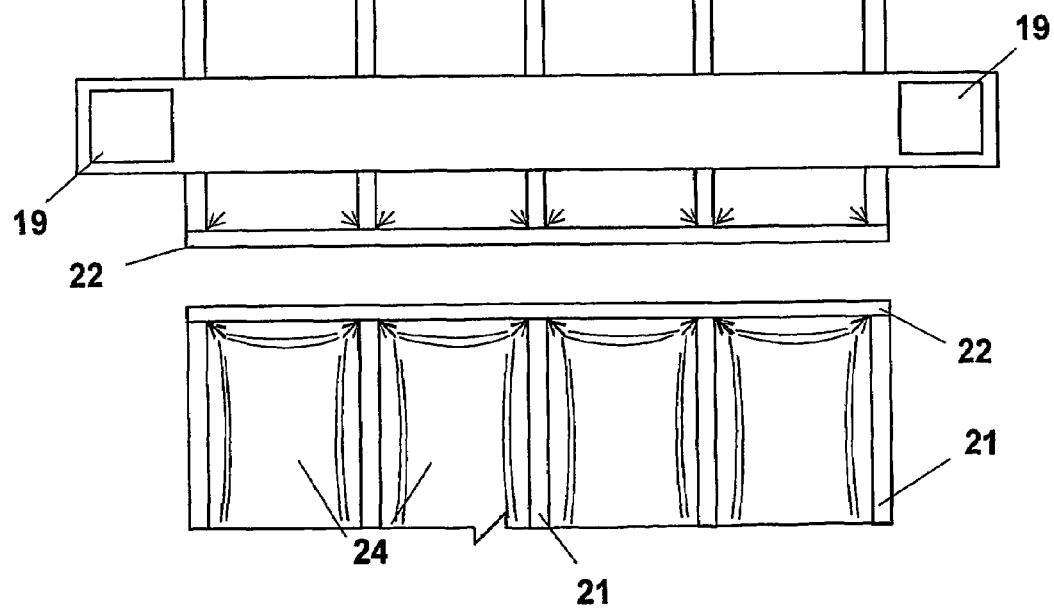

Such embodiment allows a cutting step of the films of plastic material, according to the case, making a tear line 25 (FIG. 6) or making a full cut (FIG. 8).

Figure 5:
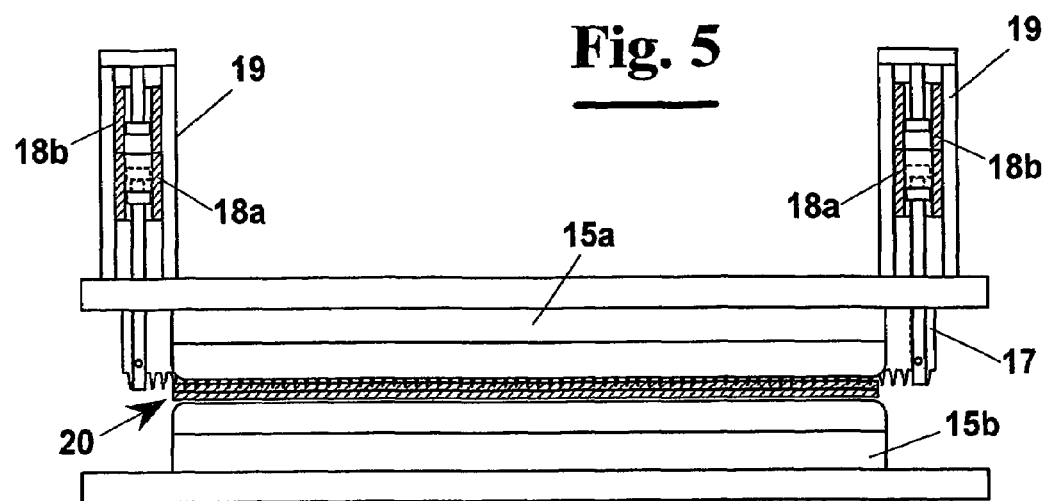
FIGS. 5 and 6 show respectively a cross sectional view of and a top plan view of the machine of FIG. 1 in the case of making a tear-out line.

In particular, to make a tear line 25 (FIGS. 5 and 6) compressed air is fed to only pneumatic actuators 18*a*, so that the respective stems move vertically up to bringing the blade 17 from a starting position external to films 20 (FIG. 9) to a position in which teeth 16 pierce films 20 up to only a part of their height (FIG. 10).

Figure 7:
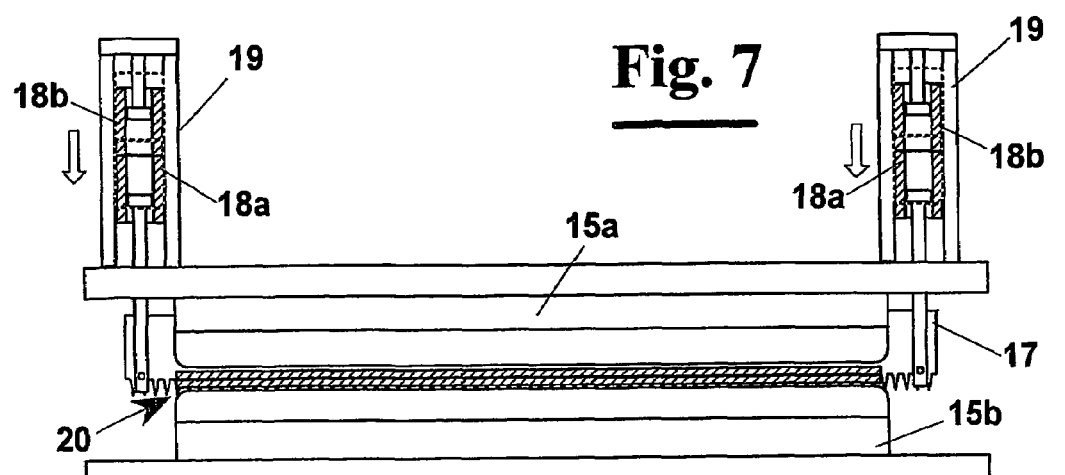
FIGS. 7 and 8 show respectively a cross sectional view of and a top plan view of the machine of FIG. 1 in the case of making a complete cut.

In the case, instead, a full cut (FIGS. 7 and 8) is requested compressed air is fed both to actuators 18*a* and to actuators 18*b*. Therefore, the stems of actuators 18*b* move vertically in a direction opposite to films 20 and pushing against a casing of a guide 19 causing actuators 18*a* and 18*b* to slide within guide 19 same (FIG. 11). This allows blade 17 to lower for a full cut of films 20.

As shown in detail in a cross sectional view of FIGS. from 12 to 14, the choice of two couples of actuators 18*a* and 18*b* as above described allows to make a tear line 25 or a full cut continuously without stopping the machine.

The packaging material obtained by the machine 1 can be stored in the form of single cushions 24, or rows of cushions 24, or rolls 65 (FIG. 15). In the latter case, the rolls 65 are wound by means of a motor 70 about a reel shaft mounted on support 60.

To prevent support 60 from being displaced from a correct position when forming roll 65, a stiff link 62 connects it to a basement 50 on which the machine is mounted 1. The support is easily freed/locked by releasable lock means.

Motor 70 can be, furthermore, connected to an electronics that operates the machine 1 by means of an electrical cable 71. This way, the electronics that operates the machine 1 can operate the stop of motor 70 if problems arise when making roll 65.

The machine 1 can be, furthermore, provided with optical sensors 80 for testing when rolling is carried out correctly. This can be executed controlling determined parameters of the process, for example, the shape and the size of a loop 30 along the web of product being rolled up 65.

More in detail if optical sensors 80 verify that loop 30 has a predetermined shape and size, electric power is supplied to motor 70 of support 60. If instead, the shape and the size of the loop 30 is not within predetermined values, for example, because the roll winding speed is too high and then the rolling power is too high, to avoid that the product is damaged the delivery of electric power to the motor 70 and then winding roll 65 on support 60 is discontinued. This avoids damages to the packaging material, owing to possible jamming or tearing caused by lack of synchronism between the rolling speed of roll 65 and the production of the web of air filled cushions 24 from machine 1.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Method for the production of packaging material in the form of tubular cushions filled with air, or other gas, comprising the steps of:
    feeding in parallel in a conveying direction two films of plastic material;
    blowing air or other gas in parallel ducts between said films of plastic material;
    making longitudinal sealing lines on said films to define tubular chambers in which air is blown by said ducts, and making on said films couples of transversal sealing lines close to each other in order to substantially form cushions containing a certain amount of air or other gas; and
    outputting a row of tubular cushions containing a predetermined amount of air or other gas trapped between two adjacent longitudinal sealing lines and two consecutive couples of transversal sealing lines close to each other,
    wherein when making a couple of transversal sealing lines close to each other, a step is provided of orthogonally moving a cutting means between said transversal sealing lines close to each other, and wherein
    said step of orthogonally moving said cutting means is made by at least one actuator capable of selectively moving said cutting means according to either a stroke for making a tear line or a stroke for making a complete cut, such that adjacent cushions of said row are connected at said transversal sealing lines by a transversal tear line and other adjacent cushions of said row are separated from each other at said transversal sealing lines y a transversal complete cut.

2. Method according to claim 1, wherein said step of cutting is made by causing a toothed blade arranged between fixed bars to move orthogonally to said films of plastic material and making, selectively, a tear line or a complete cut.

3. Method according to claim 1, wherein the step of cutting is made by a first actuator that is associated with a second actuator, such that said stroke for making a tear line is obtained by operation of said first actuator, and said stroke for making a complete cut is obtained by said first actuator and said second actuator operated at the same time.

\* \* \* \* \*